United States Patent
Yano

(10) Patent No.: US 8,978,581 B2
(45) Date of Patent: Mar. 17, 2015

(54) ADHESIVE APPLYING DEVICE

(75) Inventor: Koji Yano, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 111 days.

(21) Appl. No.: 13/564,717

(22) Filed: Aug. 2, 2012

(65) Prior Publication Data

US 2013/0032090 A1 Feb. 7, 2013

(30) Foreign Application Priority Data

Aug. 2, 2011 (JP) ................................. 2011-168983

(51) Int. Cl.
| | | |
|---|---|---|
| B05C 11/10 | (2006.01) | |
| B05B 3/00 | (2006.01) | |
| H02K 15/03 | (2006.01) | |
| B05C 5/00 | (2006.01) | |
| B05C 5/02 | (2006.01) | |
| B05C 7/06 | (2006.01) | |
| B05C 9/12 | (2006.01) | |
| B05B 13/02 | (2006.01) | |

(Continued)

(52) U.S. Cl.
CPC ................ *H02K 15/03* (2013.01); *B05C 5/001* (2013.01); *B05C 5/0212* (2013.01); *B05C 7/06* (2013.01); *B05C 9/12* (2013.01); *B05B 13/0242* (2013.01); *B25J 9/1679* (2013.01); *B05C 17/00516* (2013.01); *B05C 5/0225* (2013.01); *B05C 17/015* (2013.01); *G05B 2219/45065* (2013.01); *G05B 2219/45238* (2013.01); *Y10S 901/43* (2013.01)
USPC ........... 118/684; 118/323; 118/667; 118/706; 239/305; 901/43

(58) Field of Classification Search
CPC ............................. B05B 13/04; B05B 13/0242
USPC ......... 118/321, 323, 692, 666, 667, 665, 684, 118/679, 681, 500; 901/43; 156/578; 239/302–305
See application file for complete search history.

(56) References Cited

U.S. PATENT DOCUMENTS 5,421,940 A * 6/1995 Cornils et al. ........... 156/244.11
5,948,194 A 9/1999 Hill et al.
(Continued)

FOREIGN PATENT DOCUMENTS

| DE | 9421504 U1 | 2/1996 |
|---|---|---|
| JP | 2007-082345 | 3/2007 |
| WO | 97/18054 | 5/1997 |

OTHER PUBLICATIONS

Extended European Search Report for corresponding EP Application No. 12153453.1—2425, Aug. 8, 2012.
(Continued)

*Primary Examiner* — Yewebdar Tadesse
(74) *Attorney, Agent, or Firm* — Mori & Ward, LLP

(57) ABSTRACT

An adhesive applying device includes a robot including a robot arm; a rotor set jig for setting thereat a rotor; a gun including a holder to which a cartridge containing the adhesive is mountable, the gun discharging the adhesive in the cartridge mounted to the holder and being mountable to an end of the robot arm; an electromagnetic valve that performs on/off switching control of supply of compressed air at a predetermined pressure into the cartridge mounted to the holder of the gun; a robot controller that controls an operation of the robot; and an upper-order controller that coordinates and controls the on/off switching control performed by the electromagnetic valve and the control of the operation of the robot performed by the robot controller.

10 Claims, 13 Drawing Sheets

(51) Int. Cl.
*B25J 9/16* (2006.01)
*B05C 17/005* (2006.01)
*B05C 17/015* (2006.01)

(56) References Cited

U.S. PATENT DOCUMENTS 6,328,799 B1   12/2001   Inoue et al.
6,458,424 B1 *  10/2002  Yoshida et al. ............... 427/426

OTHER PUBLICATIONS

Chinese Office Action for corresponding CN Application No. 201210057239.3, May 23, 2014.
European Office Action for corresponding EP Application No. 12 153 453.1-1760, Aug. 1, 2014.

* cited by examiner

ADHESIVE APPLYING DEVICE

CROSS REFERENCES TO RELATED APPLICATIONS

The present application claims priority under 35 U.S.C. §119 to Japanese Patent Application No. 2011-168983, filed Aug. 2, 2011. The contents of this application are incorporated herein by reference in their entirety.

BACKGROUND OF THE INVENTION

1. Field of the Invention

An embodiment of the disclosure relates to an adhesive applying device that applies an adhesive to an object surface of an object.

2. Description of the Related Art

Hitherto, an adhesive applying device that applies an adhesive to an object surface of an object has been provided (refer to, for example, Japanese Unexamined Patent Application Publication No. 2007-82345). In the adhesive applying device, an outer peripheral surface of a circular cylindrical nozzle has a plurality of adhesive discharge openings, and the discharge openings are independently connected to a dispenser, so that a certain amount of adhesive is supplied from the dispenser. In addition, the circular cylindrical nozzle and a rotor yoke are coaxially connected to each other. In this state, an object (permanent magnet) is inserted onto the rotor yoke and the circular cylindrical nozzle, and is fitted at a side of the circular cylindrical nozzle. Then, at the same time that the adhesive is applied to an object surface (inner peripheral surface) of the object from the plurality of adhesive discharge holes, the object is moved towards the rotor yoke. When a lower end of the object approaches the adhesive discharge openings, the discharge amount of the adhesive is reduced. When the lower end of the object has passed the adhesive discharge openings, the discharge of the adhesive is stopped. This causes a clearance between an outer peripheral surface of the rotor yoke and the object surface of the object to be filled with the adhesive.

In the related art, a dedicated adhesive applying device specifically for applying an adhesive to an object surface of an object is used. When an adhesive is applied to the object surface of the object using such a dedicated adhesive applying device, cleaning, maintenance, and changing of arrangements are troublesome to perform, costs for introducing facilities are increased, and there is a lack of versatility.

SUMMARY OF THE INVENTION

According to an aspect of the present disclosure, there is provided an adhesive applying device that applies an adhesive to an object surface of an object. The adhesive applying device includes a robot including a robot arm; an object jig for setting thereat the object having the object surface; an adhesive filling unit including a holder to which a cartridge containing the adhesive is mountable, the adhesive filling unit discharging the adhesive in the cartridge mounted to the holder, and being mountable to an end of the robot arm of the robot; a first temperature maintaining unit that maintains in a desired range a temperature of the adhesive that is discharged from the adhesive filling unit; a second temperature maintaining unit that maintains in a desired range a temperature of the adhesive applied to the object surface of the object placed at the object jig; a supply controlling unit that performs on/off switching control of supply of fluid into the cartridge mounted to the holder of the adhesive filling unit, the fluid being supplied from a fluid supplying unit that supplies the fluid at a predetermined pressure; a robot controlling unit that controls an operation of the robot; and an integrated controlling unit that coordinates and controls the on/off switching control performed by the supply controlling unit and the control of the operation of the robot performed by the robot controlling unit.

DESCRIPTION OF THE PREFERRED EMBODIMENT

An embodiment will hereunder be described with reference to the drawings.

Figure 1:
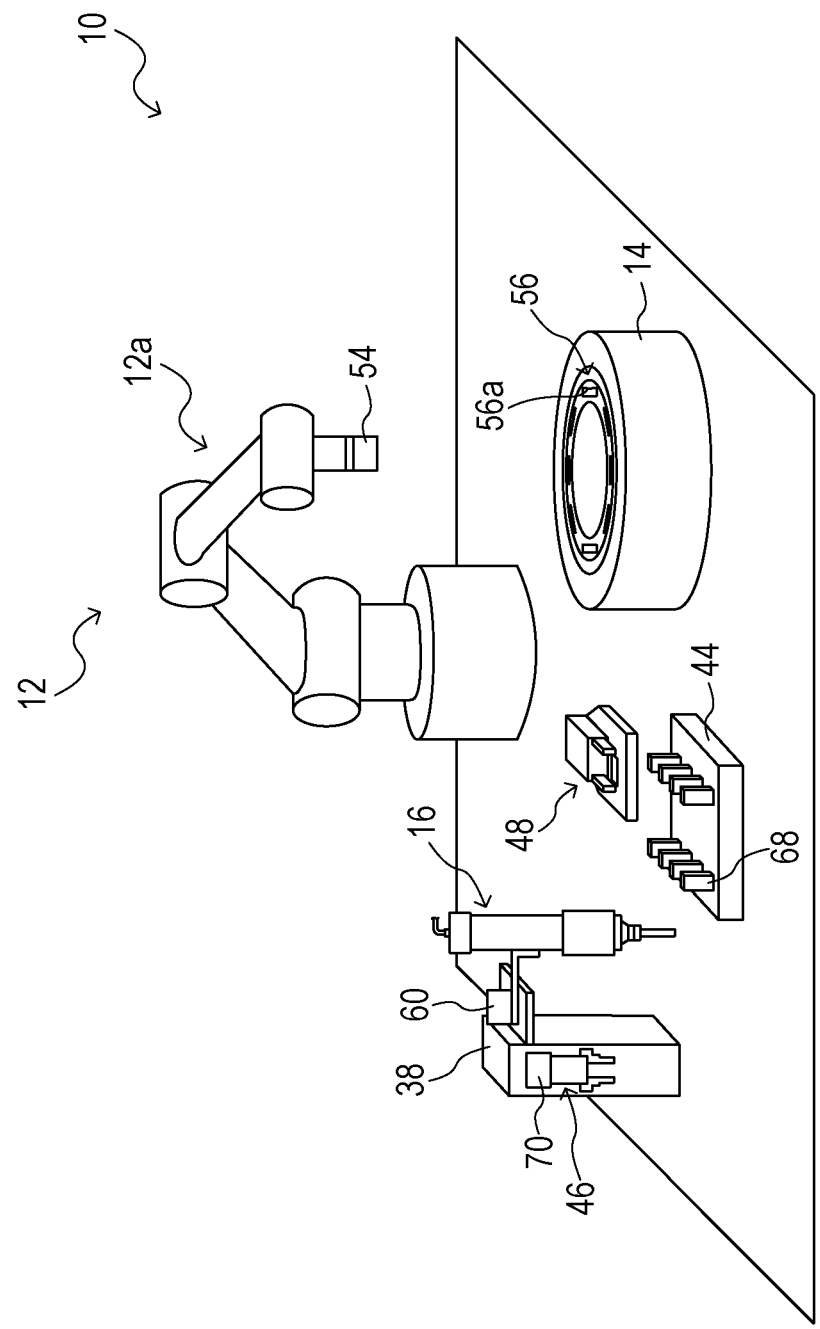
FIG. 1 is a schematic perspective view of the structure of an adhesive applying device according to an embodiment.
Figure 2:
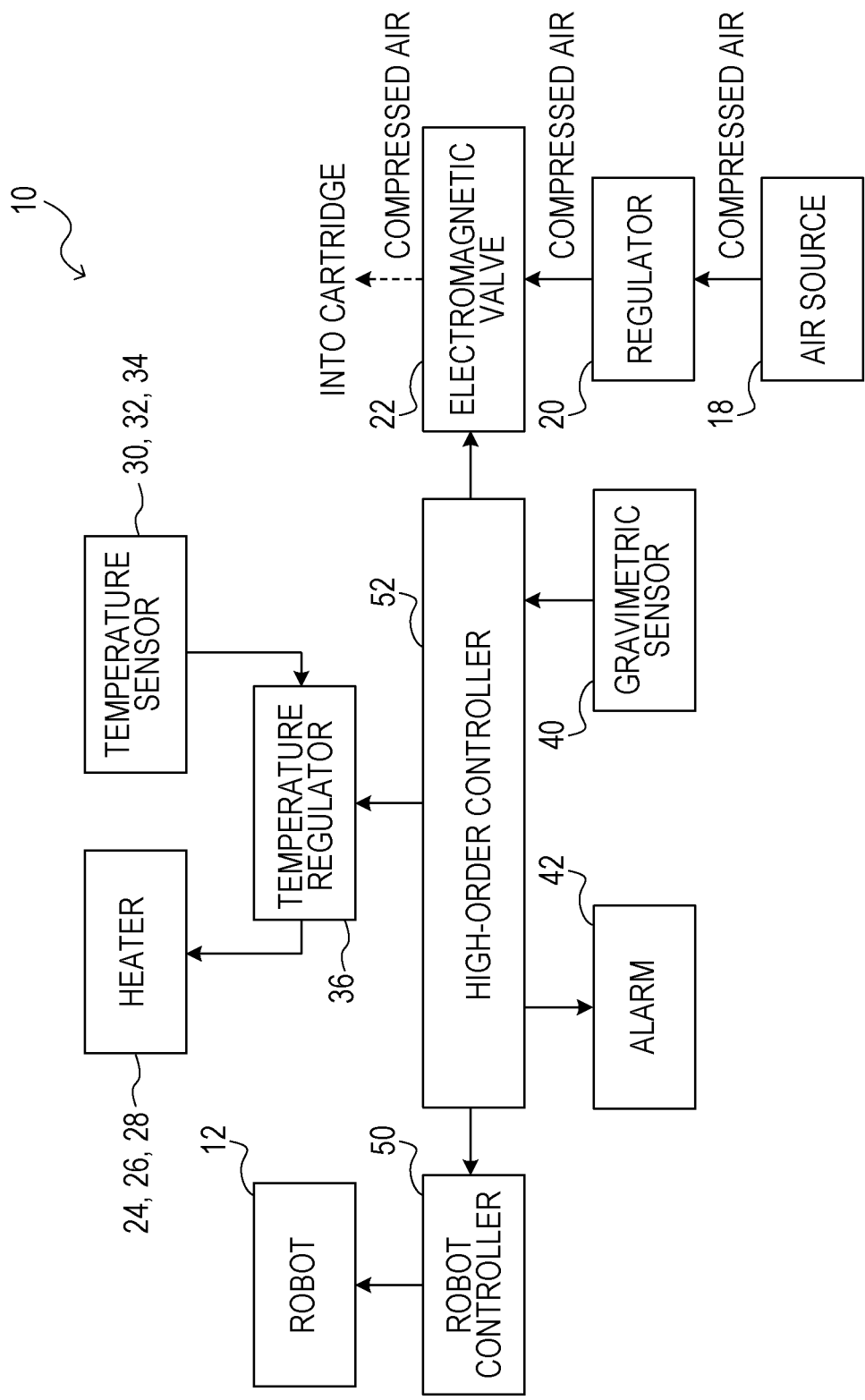
FIG. 2 is a block diagram of the mechanical structure of the adhesive applying device.

As shown in FIGS. 1 and 2, an adhesive applying device 10 according to the embodiment is a device that applies an adhesive to an inner surface (object surface) of a slot 56a (recessed portion) in a rotor 56 (object) mounted to a motor (not shown). The adhesive applying device 10 includes a robot 12, a rotor set jig 14 (object jig), a gun (adhesive filling unit), an air source 18, a regulator 20, an electromagnetic valve 22 (supply controlling unit), heaters 24, 26, and 28, temperature sensors 30, 32, and 34, a temperature regulator 36, a placement table 38, a gravimetric sensor 40 (detecting unit), an alarm 42 (informing unit), a magnetic set jig 44, a robot hand 46 (tool), a magnet re-gripping chuck 48 (adjusting unit), a robot controller 50 (robot controlling unit), and an high-order controller 52 (integrated controlling unit).

The robot 12 includes a robot arm 12a. The operation of the robot 12 is controlled by the robot controller 50. In the embodiment, the gun 16 is mounted to an end of the robot arm 12a, to allow the robot 12 to perform an applying operation (described later). The robot hand 46 is mounted to the end of the robot arm 12a, to allow the robot 12 to perform an inserting operation (described in detail later) and a pushing operation (described in detail later). A robot auto tool changer (ATC) 54 serving as a robot connecting member is set at the end of the robot arm 12a.

Figure 3:
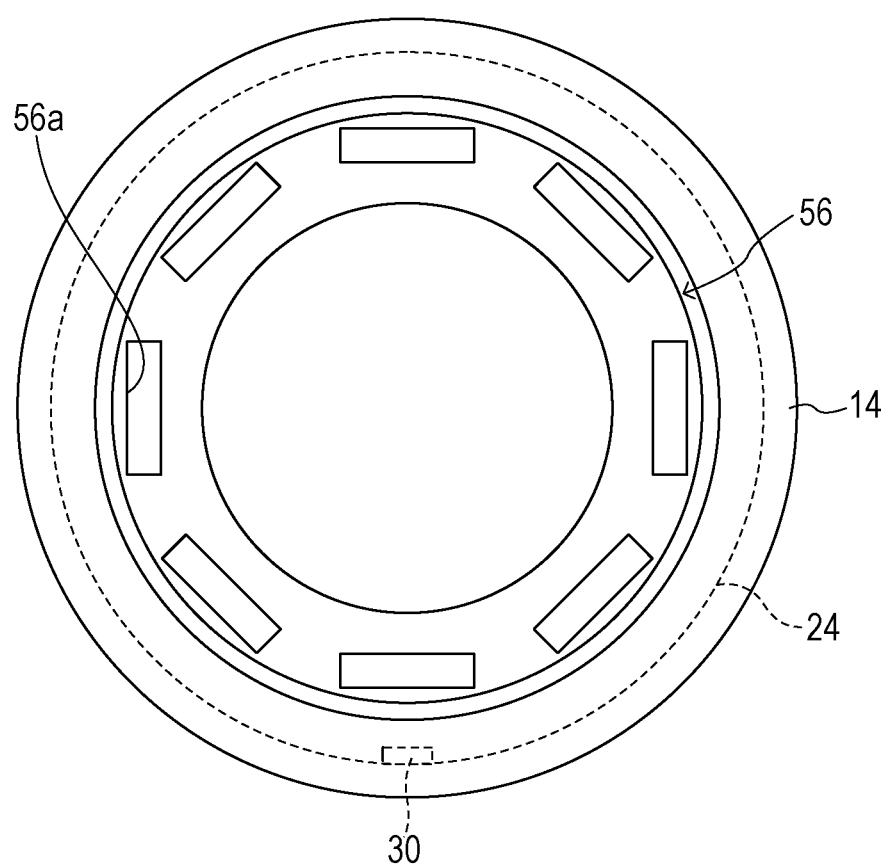
FIG. 3 is a schematic top view of the structure of a rotor set jig and the structure of a rotor.

The rotor set jig 14 is a jig for setting the rotor 56. In the embodiment, as shown in FIG. 3, the rotor 56 is set at the rotor set jig 14. Eight slots 56a having a substantially rectangular parallelepiped shape are formed in an upper surface of the rotor 56. In order that an adhesive applied to the inner surfaces of the slots 56a of the rotor 56 does not solidify, the heater 24 and the temperature sensor 30 are provided at the rotor set jig 14. Using the heater 24, the temperature sensor 30, and the temperature regulator 36, the temperature of the adhesive applied to the inner surfaces of the slots 56a of the rotor 56 is maintained in a desired range.

Figure 4:
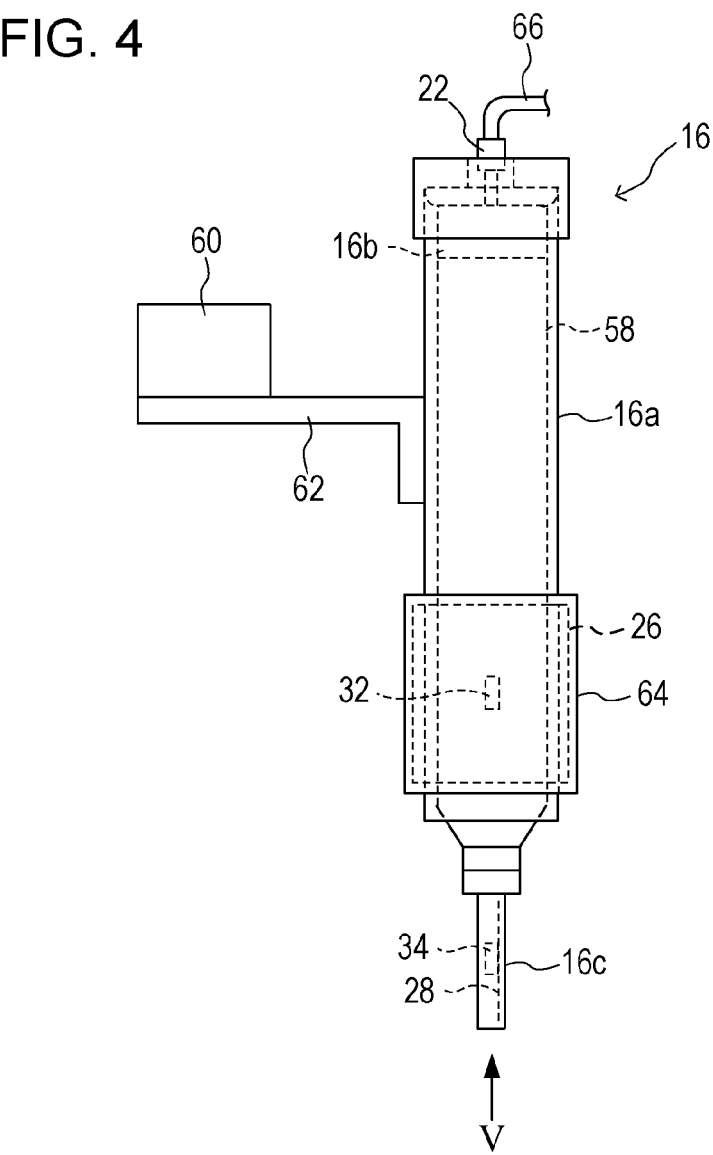
FIG. 4 is a schematic side view of the structure of a gun.

As shown in FIG. 4, the gun 16 includes a holder 16a, a piston 16b, and a nozzle 16c. A cartridge 58 containing an adhesive in a hollow inner portion thereof is mountable to the holder 16a. The piston 16b is slidable in the cartridge 58 while being in close contact with an inner peripheral surface of the cartridge 58 mounted to the holder 16a, and pushes out an adhesive. The nozzle 16c is mountable to an end of the cartridge 58, and discharges the adhesive.

A gun ATC 60 (first connecting member) is set at the holder 16a through a supporting member 62. The gun ATC 60 is connectable to the robot ATC 54. Connecting the gun ATC 60 to the robot ATC 54 makes it possible to mount the gun 16 to the end of the robot arm 12a. In order to keep the viscosity of the adhesive in the cartridge 58 within a desired range, the heater 26 is wound around an outer peripheral surface of the holder 16a and the temperature sensor 32 is provided at the outer peripheral surface of the holder 16a. The heater 26 and the temperature sensor 32 are secured to the outer peripheral surface of the holder 16a by a securing member 64. By the heater 26, the temperature sensor 32, and the temperature regulator 36, the temperature of the adhesive in the cartridge 58 is maintained in a desired range.

At an end portion opposite the nozzle 16c at the cartridge 58 mounted to the holder 16a, the other end of the air tube 66 connected to the regulator 20 and the electromagnetic valve 22 is disposed. One end of the air tube 66 is connected to the air source 18.

The air source 18 supplies compressed air (fluid) through the air tube 66. The regulator 20 regulates the pressure of the compressed air supplied from the air source 18. The compressed air whose pressure has been regulated by the regulator 20 is supplied through the air tube 66 at a predetermined pressure. The air source 18 and the regulator 20 correspond to a fluid supplying unit in the claims. The electromagnetic valve 22 performs opening/closing switching control on the other end of the air tube 66, so that the electromagnetic valve 22 performs on/off switching control of the supply of the compressed air (supplied from the air source 18, whose pressure has been regulated by the regulator 20, and having the predetermined pressure) into the cartridge 58.

That is, when the electromagnetic valve 22 closes the other end of the air tube 66, the adhesive in the cartridge 58 is not discharged from the nozzle 16c while the state of supply of the compressed air into the cartridge 58 is being switched to an off state. In contrast, when the electromagnetic valve 22 opens the other end of the air tube 66, if the state of supply of the compressed air into the cartridge 58 is switched to an on state, the compressed air is supplied to a gap that is situated at a side of an upper portion 16b in the cartridge 58 through the air tube 66. This causes the piston 16b to slide in the cartridge 58 towards the nozzle 16c, to push out the adhesive in the cartridge 58 and to discharge the adhesive from the nozzle 16c.

Figure 5:
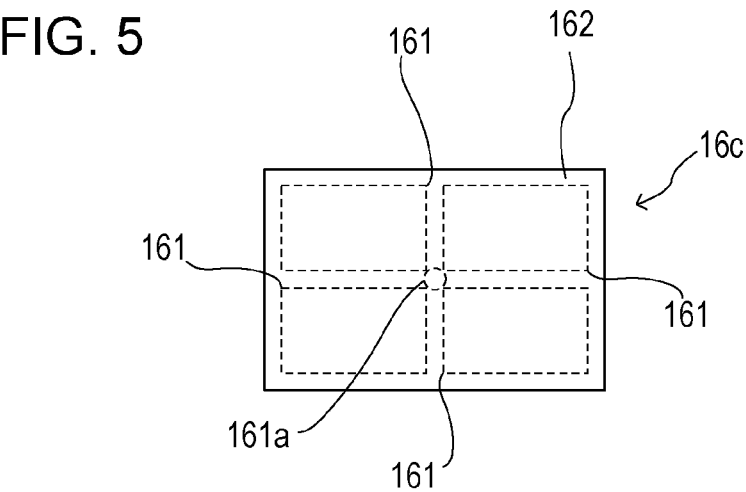
FIG. 5 is a plan view of a nozzle corresponding to an arrow view as seen from the direction of arrow V in FIG. 4.

As shown in FIG. 5, the nozzle 16c includes a discharge opening 161 and a groove 162. The discharge opening 161 is provided at a substantially central portion in a radial direction and discharges the adhesive in the cartridge 58 to the outside through an internal tube 161a. The groove 162 guides the adhesive discharged from the discharge opening 161 towards an outer periphery in the radial direction. That is, the adhesive discharged from the discharge opening 161 is guided towards the outer periphery in the radial direction by moving along the groove 162. As shown in FIG. 4, in order that solidification of the adhesive that accumulates in the nozzle 16c and is not discharged from the discharge opening 161 does not occur, the heater 28 and the temperature sensor 34 are buried in the nozzle 16c. By the heater 28, the temperature 34, and the temperature regulator 36, the temperature of the adhesive that accumulates in the nozzle 16c is maintained in a desired range.

The temperature regulator 36 controls the heater 26 on the basis of information regarding the temperature detected by the temperature sensor 32 to maintain the temperature of the adhesive in the cartridge 58 mounted to the holder 16a of the gun 16 in a desired range. The temperature regulator 36 controls the heater 28 on the basis of information regarding the temperature detected by the temperature sensor 34 to maintain the temperature of the adhesive that accumulates in the nozzle 16c of the gun 16 in a desired range. This maintains the temperature of the adhesive discharged from the nozzle 16c of the gun 16 in a desired range. That is, the heaters 26 and 28, the temperature sensors 32 and 34, and the temperature regulator 36 correspond to a first temperature maintaining unit in the claims. The temperature regulator 36 controls the heater 24 on the basis of information regarding the temperature detected by the temperature sensor 30 to maintain the temperature of the adhesive applied to the inner surface of the slot 56a of the rotor 56 that is set at the rotor set jig 14 in a desired range. That is, the heater 24, the temperature sensor 30, and the temperature regulator 36 correspond to a second temperature maintaining unit in the claims.

The placement table 38 is a table for placing the gun 16 thereon. The gravimetric sensor 40 is provided at the placement table 38. The gravimetric sensor 40 detects the weights of detection objects including, for example, the gun 16 that is placed on the placement table 38, the cartridge 58 mounted to the holder 16a of the gun 16, and the adhesive in the cartridge 58. Information regarding the weights of the detection objects detected by the gravimetric sensor 40 is input to the high-order controller 52.

When the difference between the weights of the detection objects detected by the gravimetric sensor 40 before starting an applying operation (described later) and the weights of the detection objects detected by the gravimetric sensor 40 after completion of the applying operation, that is, a discharge amount of the adhesive discharged from the nozzle 16c of the gun 16 during the applying operation (an amount of adhesive applied to the inner surfaces of the eight slots 56a of the rotor 56 disposed at the rotor set jig 14) falls outside a desired range, the alarm 42 is controlled by the high-order controller 52 so that the alarm 42 informs a user of this.

The magnet set jig 44 is a jig for setting thereon substantially rectangular parallelepiped magnets 68 (adhesion objects). In this embodiment, eight magnets 68 are set on the magnet set jig 44.

Figure 6:
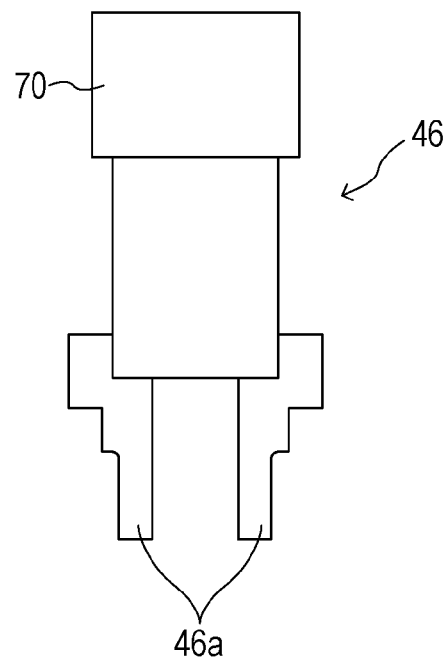
FIG. 6 is a schematic side view of the structure of a robot hand.

As shown in FIG. 6, two gripping members 46a that are movable towards and away from each other are provided at an end of the robot hand 46. The two gripping members 46a are formed so as to be capable of gripping the magnets 68 that are set on the magnet set jig 44. A hand ATC 70 (second connecting member) that is connectable to the robot ATC 54 is set at an end portion of the robot hand 46 at a side opposite the gripping members 46a. By connecting the hand ATC 70 to the robot ATC 54, the robot hand 46 can be mounted to the end of the robot arm 12a.

Figure 7:
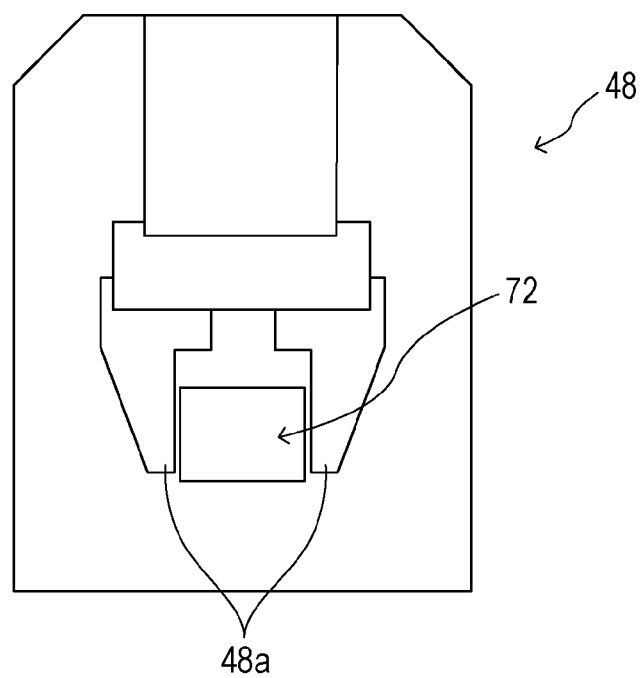
FIG. 7 is a schematic top view of the structure of a magnet re-gripping chuck.
Figure 8:
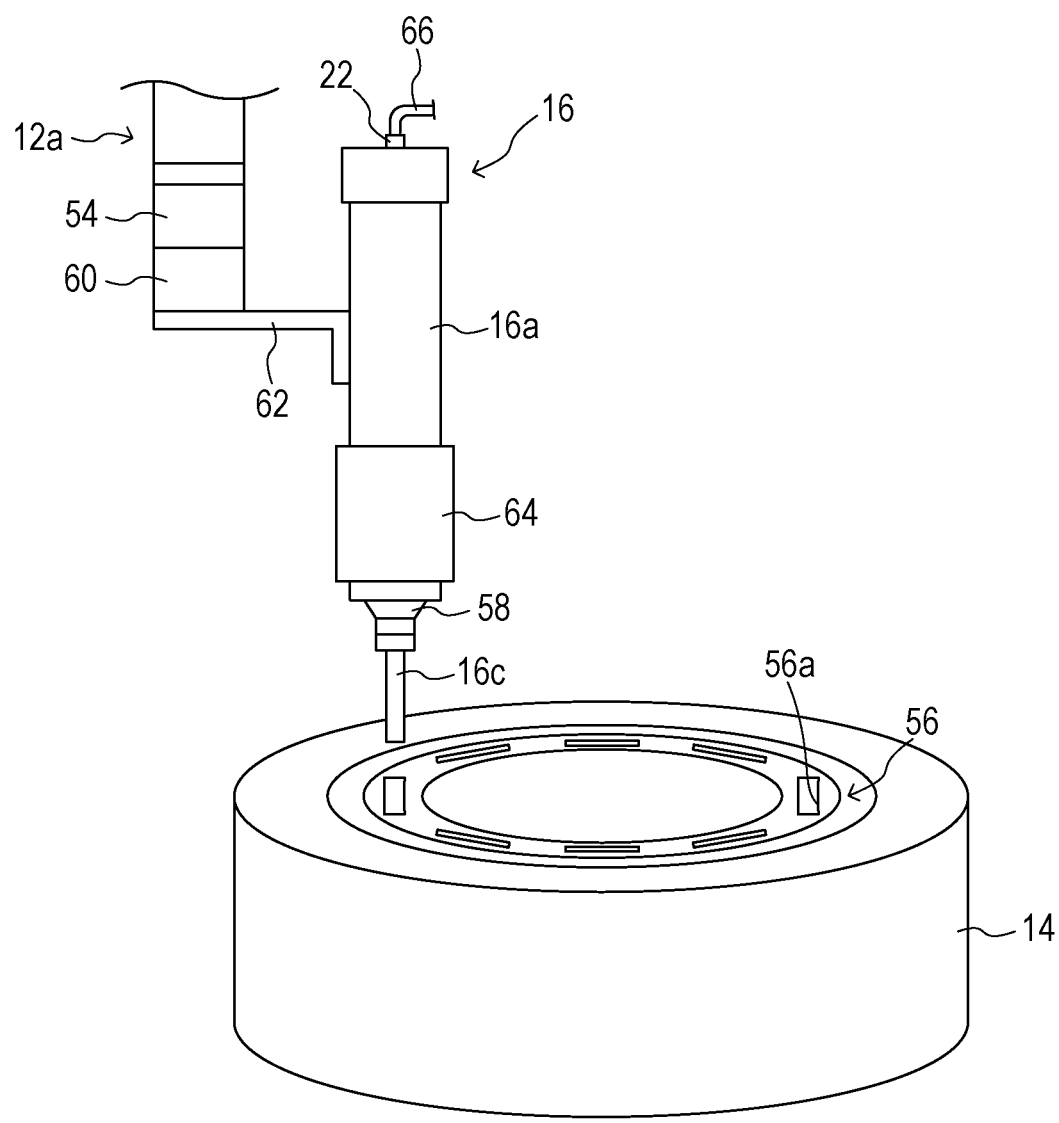
FIG. 8 is a perspective view illustrating an applying operation that is performed by the robot.

As shown in FIG. 7, the magnet re-gripping chuck 48 includes two gripping members 48a that are movable towards and away from each other. By gripping a magnet 68 that is set in a predetermined area 72 between the two gripping members 48a by the two gripping members 48a, the magnet re-gripping chuck 48 is capable of adjusting a gripping position of the magnet 68 gripped by the two gripping members 46a of the robot hand 46 to a substantially center position along a direction orthogonal to the direction of movement of the gripping members 46a.

The robot controller 50 controls the operation of the robot 12.

The high-order controller 52 coordinates and controls the on/off switching control performed by the electromagnetic valve 22 of the supply of compressed air into the cartridge 58, and control of the operation of the robot 12 performed by the robot controller 50. Previously set correction coefficients corresponding to the amounts of adhesive in the cartridge 58 mounted to the holder 16a of the gun 16 are stored in a memory of the high-order controller 52 as appropriate. In the embodiment, the amounts of adhesive in the cartridge 58 are divided in accordance with a plurality of stages (such as four stages). The correction coefficients corresponding to the stages, that is, time information added to an on supplying time of the supply of compressed air into the cartridge 58 realized by the electromagnetic valve 22 (that is, an opening time at the other end of the air tube 66 realized by the electromagnetic valve 22) are previously stored. For example, if the amount of adhesive in the cartridge 58 before the adhesive is used is 400 cc, the first stage is a stage when the amount of adhesive in the cartridge 58 is 300 cc to 400 cc, the second stage is a state when the amount of adhesive in the cartridge 58 is 200 cc to 300 cc, the third stage is a stage when the amount of adhesive in the cartridge 58 is 100 cc to 200 cc, and the fourth stage is a stage when the amount of adhesive in the cartridge 58 is 0 cc to 100 cc. The correction coefficients are previously stored so that the correction coefficient in the first stage is 0 seconds (substantially no correction), the correction coefficient in the second stage is 0.05 seconds, the correction coefficient in the third stage is 0.1 seconds, and the correction coefficient in the fourth stage is 0.15 seconds. Using the correction coefficients stored in the memory as appropriate, the high-order controller 52 corrects the on switching time of the supply of compressed air into the cartridge 58 realized by the electromagnetic valve 22 (that is, the opening time at the other end of the air tube 66 realized by the electromagnetic valve 22), in accordance with the amount of adhesive in the cartridge 58 mounted to the holder 16a of the gun 16.

Next, an exemplary series of operations that are executed by the robot 12 in the embodiment will be described with reference to FIGS. 8 to 15.

In FIGS. 8 to 15B, the robot 12 is in a standby state, that is, does not start to operate until a predetermined operation start command is input. When the predetermined operation start command is input, the robot 12 starts to operate. First, as shown in FIG. 8 and FIGS. 9A to 9C, the robot ATC 54 at the end of the robot arm 12a of the robot 12 is moved, and the gun ATC 60 of the gun 16 that is placed on the placement table 38 is connected to the robot ATC 54, to mount the gun 16 to the end of the robot arm 12a. By discharging the adhesive in the cartridge 58, mounted to the holder 16a, from the nozzle 16c of the gun 16, mounted to the end of the robot arm 12a, while the robot arm 12a is operating, an applying operation in which the adhesive is applied to the inner surfaces of the slots 56a of the rotor 56 that is set at the rotor set jig 14 is performed.

Figure 9A:
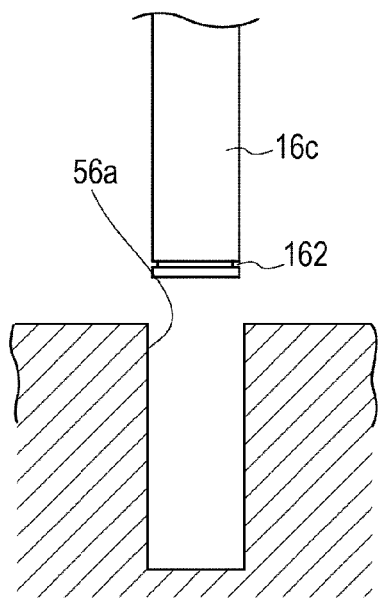
FIGS. 9A to 9C are schematic views illustrating the applying operation that is performed by the robot.
Figure 9A:
Figure 9B:
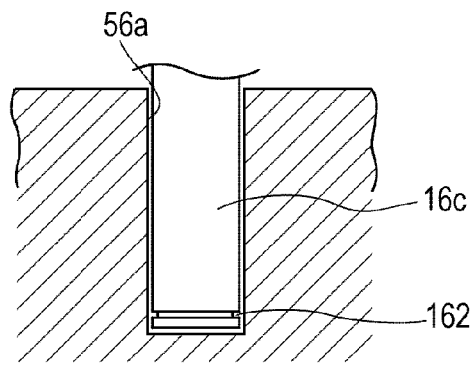
Figure 9B:
Figure 9C:
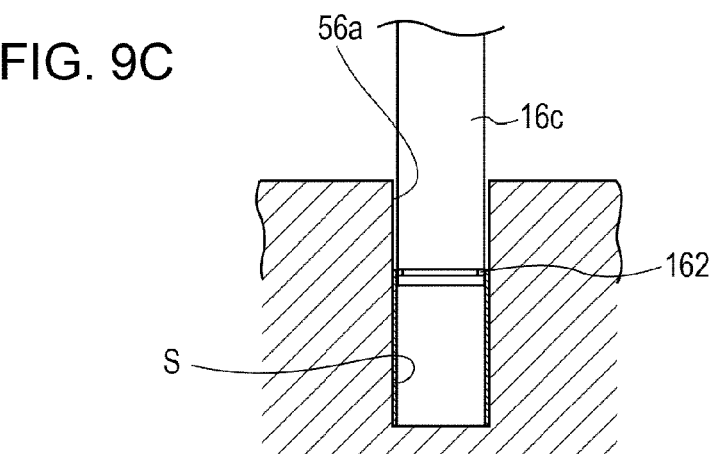
Figure 10:
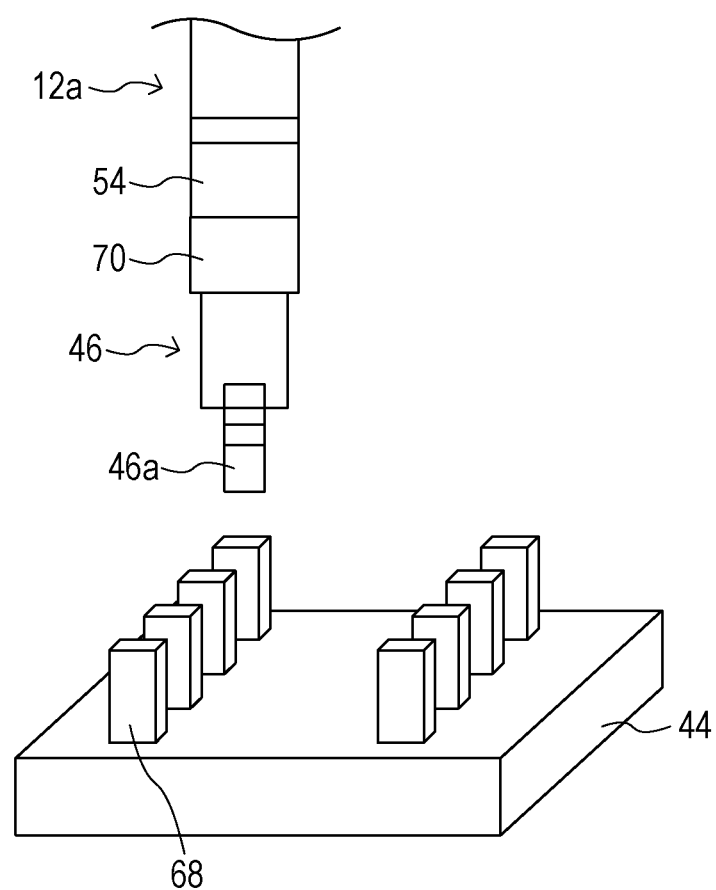
FIG. 10 is a perspective view illustrating an inserting operation that is performed by the robot.

As shown in FIGS. 9A to 9C, in the applying operation, the robot 12 moves the end of the nozzle 16c to a location above a slot 56a (see FIG. 9A), and the end of the nozzle 16c is inserted to the vicinity of a bottom portion of the slot 56a (see FIG. 9B), after which, while the end of the nozzle 16c is moved towards an opening from the vicinity of the bottom portion of the slot 56a, the adhesive is discharged from the nozzle 16c, so that the adhesive is applied to the inner surface of the slot 56a (see FIG. 9C). In FIG. 9C, the adhesive applied to the inner surface of the slot 56a is represented by a symbol S. After the aforementioned operations are successively performed with respect to the inner surfaces of the eight slots 56a of the rotor 56, the applying operation ends.

When the applying operation ends, the robot 12 moves the gun 16 mounted to the end of the robot arm 12a, and disconnects the gun ATC 60 from the robot ATC 54, so that the gun 16 is removed from the end of the robot arm 12a, and is placed on the placement table 38. Then, as shown in FIGS. 10 to 14, the robot ATC 54 at the end of the robot arm 12a is moved, and the hand ATC 70 of the robot hand 46 is connected to the robot ATC 54, to mount the robot hand 46 to the end of the robot arm 12a. Then, as a predetermined operation, the two gripping members 46a of the robot hand 46 mounted to the end of the robot arm 12a grip a magnet 68 that is set on the magnet set jig 44, to perform an inserting operation in which the magnet 68 is inserted into the slot 56a of the rotor 56 to whose inner surface the adhesive has been applied in the applying operation.

Figure 11A:
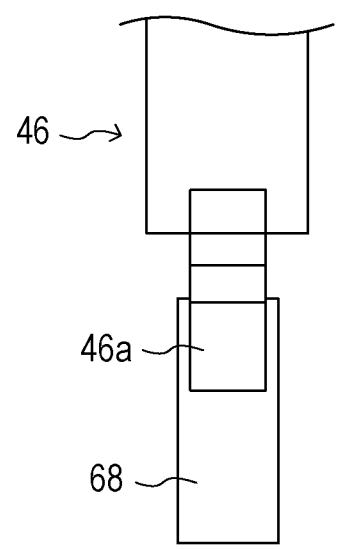
FIGS. 11A and 11B are side views illustrating the inserting operation that is performed by the robot.
Figure 11B:
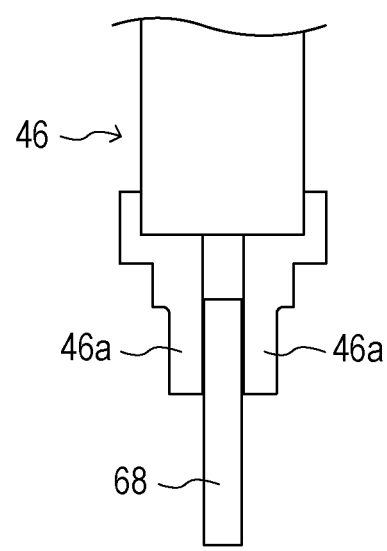
Figure 12A:
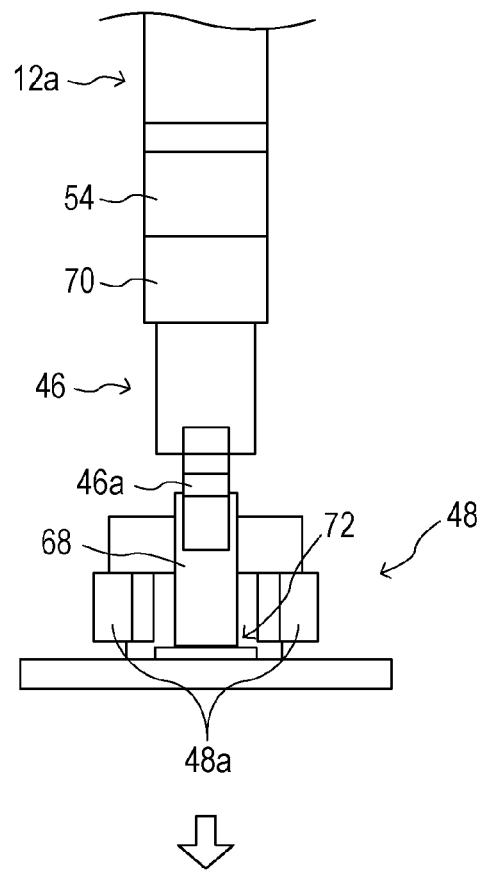
FIGS. 12A and 12B are side views illustrating the inserting operation that is performed by the robot.
Figure 12B:
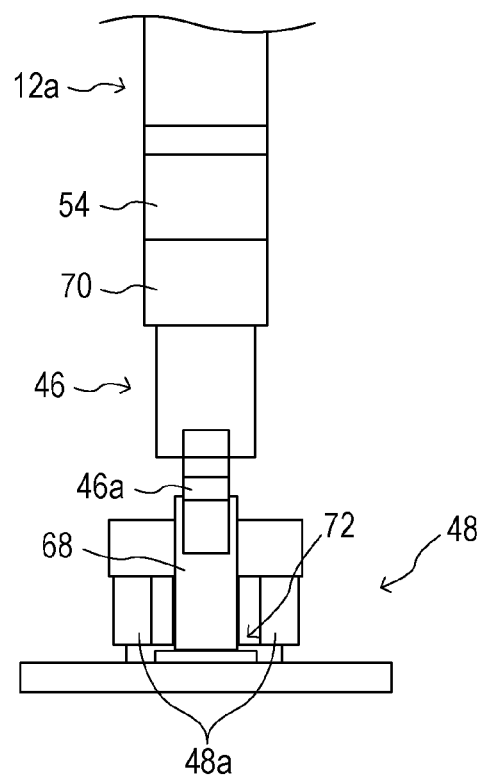
Figure 13:
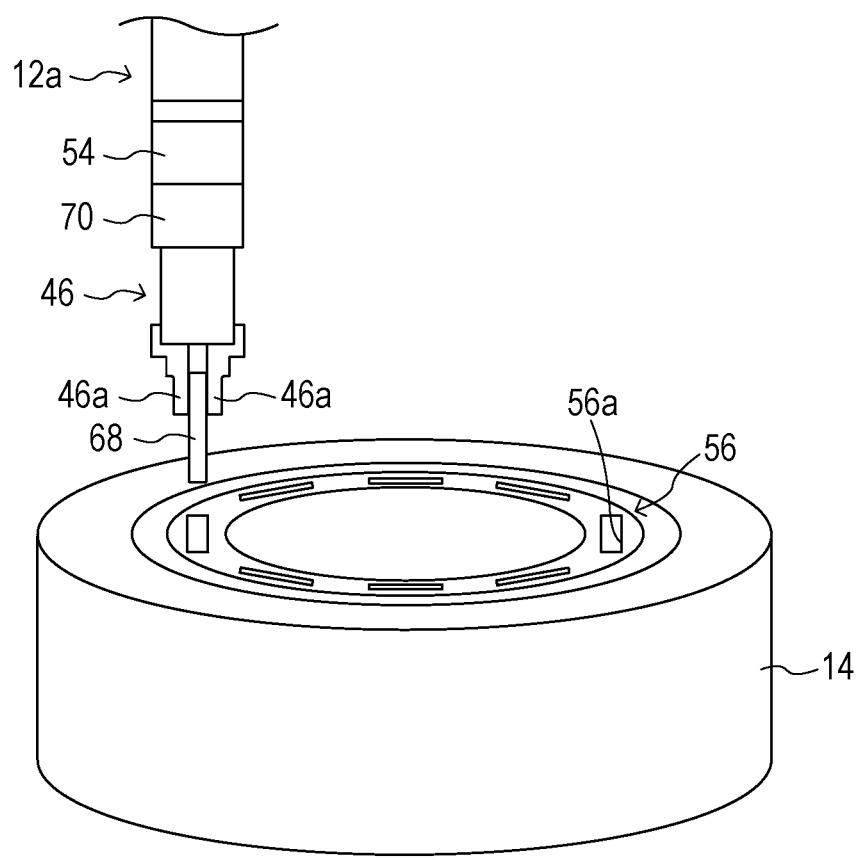
FIG. 13 is a perspective view illustrating the inserting operation performed by the robot.
Figure 14:
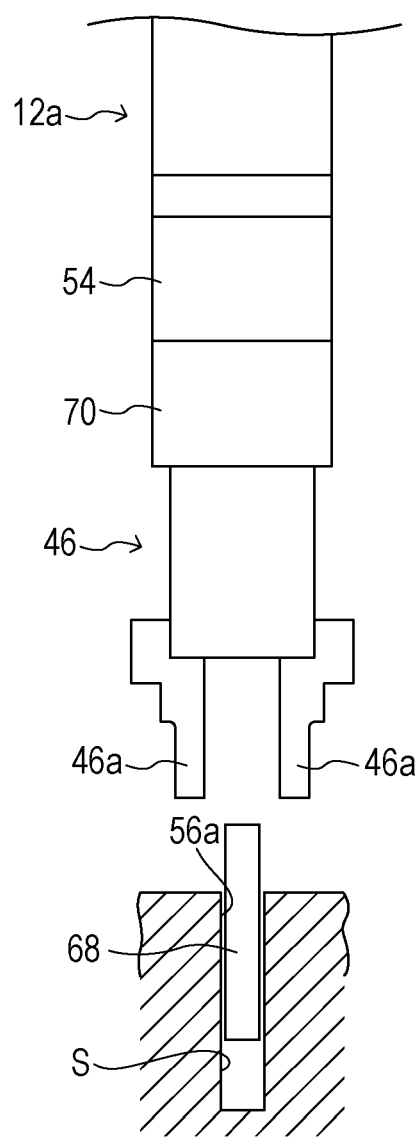
FIG. 14 is a schematic view illustrating the inserting operation that is performed by the robot.

In the inserting operation, as shown in FIGS. 11A and 11B, the gripping members 46a of the robot hand 46 grip the magnet 68 in a thickness direction, and move the magnet 68, so that, as shown in FIG. 12A, the gripping members 46a ungrip the magnet 68 in the area 72, to set the magnet 68 in the magnet re-gripping chuck 48. When this is done, as shown in FIG. 12B, the two gripping members 48a of the magnet re-gripping chuck 48 grip the set magnet 68 in a widthwise direction. This causes a gripping position where the magnet 68 is gripped by the two gripping members 46a of the robot hand 46 to be adjusted to a substantially center position along a direction orthogonal to the direction of movement of the gripping members 46a. Then, as shown in FIG. 13, the two gripping members 46a of the robot hand 46 grip again in the thickness direction the magnet 68 whose gripping position has been adjusted, and move the magnet 68 to the location above the slot 56a of the rotor 56 to whose inner surface the adhesive has been applied in the applying operation. Then, as shown in FIG. 14, the gripping members 46a insert the magnet 68 into the slot 56a. This ends the inserting operation.

Figure 15A:
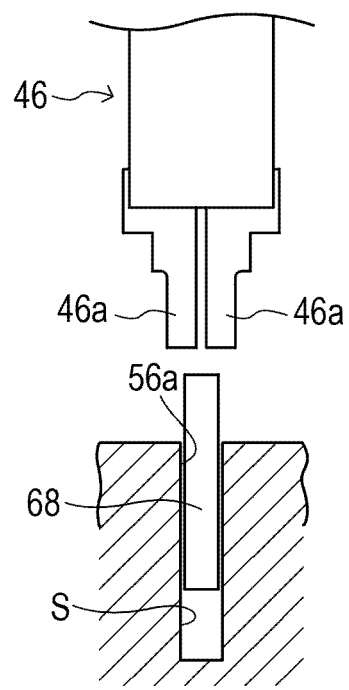
FIGS. 15A and 15B are schematic views illustrating a pushing operation that is performed by the robot.
Figure 15A:
Figure 15B:
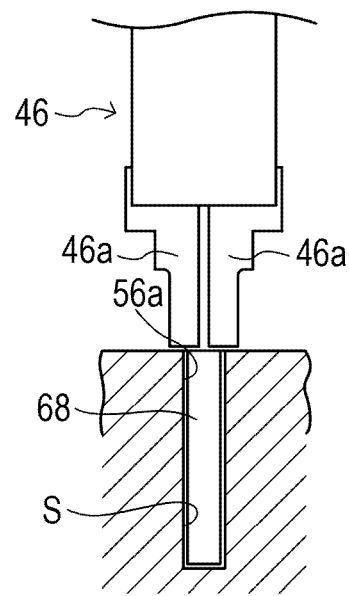

After the inserting operation ends, as shown in FIGS. 15A and 15B, the two gripping members 46a of the robot hand 46, mounted to the end of the robot arm 12a, of the robot 12 perform a pushing operation for pushing down an opposite surface of the magnet 68 inserted into the slot 56a of the rotor 56 in the inserting operation, to accommodate the magnet 68 in the slot 56a. The opposite surface of the magnet 68 that is pushed is situated at a side opposite a front end side of the magnet 68 in an insertion direction. This ends the pushing operation.

When the pushing operation ends, an inserting operation is performed again, so that the two gripping members 46a of the robot hand 46 grip the next magnet 68 that is set on the magnet set jib 44, and insert the next magnet 68 into the next slot 56a of the rotor 56. Then, a pushing operation is performed again, so that the two gripping members 46*a* of the robot hand 46 cause the magnet 68 to be accommodated in the slot 56*a*. Then, after accommodating the magnets 68 in the eight slots 56*a* by repeating inserting operations and pushing operations, the robot 12 ends the series of operations.

An exemplary content of control in the series of operations executed by the robot 12 described above will be described.

The high-order controller 52 coordinates and controls the electromagnetic valve 22 and the robot controller 50 so that the applying operation is performed. The applying operation is performed by causing the robot 12 to move the end of the nozzle 16*c* of the gun 16 mounted to the end of the robot arm 12*a* to a location above a slot 56*a* of the rotor 56 that is set on the rotor set jig 14; inserting the end of the nozzle 16*c* up to the vicinity of the bottom portion of the slot 56*a*; and then, while moving the end of the nozzle 16*c* towards the opening from the vicinity of the bottom portion of the slot 56*a*, discharging the adhesive from the nozzle 16*c*. By this, the on/off switching control performed by the electromagnetic valve 22 of the supply of compressed air into the cartridge 58, and the control of the operation of the robot 12 performed by the robot controller 50 are coordinated and controlled.

The robot controller 50 controls the robot 12 so that, when the applying operation achieved by the coordination control of the high-order controller 52 ends, the gun 16 is removed from the end of the robot arm 12*a*, and is placed on the placement table 38, and, then, the robot hand 46 is mounted to the end of the robot arm 12*a* to perform the above-described inserting operation as a predetermined operation. More specifically, the robot 12 is controlled so that, in the inserting operation, the two gripping members 46*a* of the robot hand 46 mounted to the end of the robot arm 12*a* grip and move the magnet 68 that is set on the magnet set jig 44; ungrip the magnet 68 in the area 72, to set the magnet 68 in the magnet re-gripping chuck 48; and, then, when the magnet re-gripping chuck 48 has adjusted the gripping position of the magnet 68 to the substantially center position, the two gripping members 46*a* grip and move again the magnet 68 to insert the magnet 68 into the slot 56*a* of the rotor 56 to whose inner surface the adhesive has been applied in the applying operation.

When the gun 16 is placed on the placement table 38 after the applying operation ends, the weights of the detection objects at this time are detected by the gravimetric sensor 40, to input weight information of the detected detection objects to the high-order controller 52. This causes the high-order controller 52 to determine whether or not the difference between the weights of the detection objects detected by the gravimetric sensor 40 before starting the applying operation and the weights of the detection objects detected by the gravimetric sensor 40 after completion of the applying operation, that is, a discharge amount of the adhesive discharged from the gun 16 during the applying operation (an amount of adhesive applied to the inner surfaces of the eight slots 56*a* of the rotor 56) is outside a desired range. If the difference is outside the desired range, the alarm 42 is controlled so that a user is informed of this.

The robot controller 50 controls the robot 12 so that, when the applying operation ends, the two gripping members 46*a* of the robot hand 46 mounted to the end of the robot arm 12*a* perform the above-described pushing operation.

As described above, the adhesive applying device 10 according to the embodiment includes the robot 12 including the robot arm 12*a*, the rotor set jig 14 on which the rotor 56 is placed, the gun 16 that is mountable to the end of the robot arm 12*a*, the electromagnetic valve 22, the temperature sensor 34, the robot controller 50 that controls the operation of the robot 12, and the high-order controller 52. The gun 16 includes the holder 16*a* to which the cartridge 58 containing an adhesive is mountable. The adhesive in the cartridge 58 mounted to the holder 16*a* is discharged from the nozzle 16*c*. The holder 16*a* is provided with the heater 26 and the temperature sensor 32. The nozzle 16*c* is provided with the heater 28 and the temperature sensor 34. The heaters 26 and 28, the temperature sensors 32 and 34, and the temperature regulator 36 are capable of not allowing solidification of the adhesive in the gun 16, and keeping the viscosity of the adhesive in the gun 16 substantially uniform. Therefore, it is possible to cause the amount of adhesive discharged from the gun 16 to be substantially uniform. As a result, it is possible to cause the amount of adhesive applied to the inner surfaces of the slots 56*a* of the rotor 56 that is set on the rotor set jig 14 to be substantially uniform. The rotor set jig 14 is provided with the heater 24 and the temperature sensor 30. The heater 24, the temperature sensor 30, and the temperature regulator 36 maintain within a desired range the temperature of the adhesive applied to the inner surfaces of the slots 56*a* of the rotor 56 that is placed on the rotor set jig 14. This does not allow the adhesive applied to the inner surfaces of the slots 56*a* of the rotor 56 that is placed on the rotor set jig 14 to solidify prior to the above-described inserting operation. The electromagnetic valve 22 performs on/off switching control on the supply of compressed air (supplied from the air source 18, having the predetermined pressure, and whose pressure has been regulated by the regulator 20). The high-order controller 52 coordinates and controls the on/off switching control performed by the electromagnetic valve 22 of the supply of compressed air into the cartridge 58, and the control of the operation of the robot 12 performed by the robot controller 50. Accordingly, the robot 12 is capable of smoothly performing an applying operation in which an adhesive is applied to the inner surfaces of the slots 56*a* of the motor 56 that is set on the rotor set jig 14 when the gun 16 is mounted to the end of the robot arm 12*a*.

For example, when an adhesive is applied to the inner surfaces of the slots 56*a* of the rotor 56 using a dedicated adhesive applying device specifically for applying an adhesive to the inner surfaces of the slots 56*a* of the rotor 56, for example, cleaning, maintenance, and changing of arrangements are troublesome to perform, costs for introducing facilities are increased, and there is a lack of versatility. In contrast, in the adhesive applying device 10 according to the embodiment, the robot 12 is capable of applying an adhesive to the inner surfaces of the slots 56*a* of the rotor 56 when the robot 12 mounts the gun 16 to the robot arm 12*a*. Therefore, a dedicated adhesive applying device such as that described above is not used, and it is possible to enhance versatility.

In the embodiment, in particular, the high-order controller 52 coordinates and controls the electromagnetic valve 22 and the robot controller 50 so that an applying operation in which an adhesive is applied to the inner surfaces of the slots 56*a* of the rotor 56 (that is set on the rotor set jig 14) by discharging the adhesive from the gun 16 (mounted to the end of the robot arm 12*a*) while the robot 12 operates its robot arm 12*a*. This makes it possible for the robot 12 to reliably perform the applying operation in which the adhesive is applied to the inner surfaces of the slots 56*a* of the rotor 56.

In the embodiment, in particular, the robot hand 46 mountable to the end of the robot arm 12*a*, the robot ATC 54 that is set at the end of the robot arm 12*a*, the gun ATC 60 that is set at the gun 16, and the hand ATC 70 that is set at robot hand 46 are provided. The gun ATC 60 and the hand ATC 70 are connectable to the robot ATC 54. This makes it possible to easily mount and dismount the robot hand 46 and the gun 16 to and from the end of the robot arm 12*a*. Therefore, it is possible to easily remove the gun 16 and mount the robot hand 46, or remove the robot hand 46 and mount the gun 16. In addition, the high-order controller 52 coordinates and controls the electromagnetic valve 22 and the robot controller 50 so that the above-described applying operation is performed by discharging the adhesive from the gun 16 (mounted to the end of the robot arm 12a by connecting the gun ATC 60 to the robot ATC 54) while the robot 12 operates its robot arm 12a. This makes it possible for the robot 12 to reliably perform the applying operation. The robot controller 50 controls the robot 12 so that, when the applying operation performed as a result of the coordination control of the high-order controller 52 ends, the gun 16 is removed from the end of the robot arm 12a by disconnecting the gun ATC 60 from the robot ATC 54, and, then, the ATC 70 is connected to the robot ATC 54 to mount the robot hand 46 to the end of the robot arm 12a, so that a predetermined operation is performed with respect to the inner surfaces 56a of the rotor 56 to which an adhesive has been applied in the applying operation. This makes it possible to cause the robot 12 to reliably perform the predetermined operation with respect to the inner surfaces of the slots 56a of the rotors 56, to which the adhesive has been applied in the applying operation, by dismounting the gun 16 and mounting the robot hand 46 after the applying operation.

In the embodiment, in particular, the high-order controller 52 coordinates and controls the electromagnetic valve 22 and the robot controller 50 so that, in the applying operation, the robot 12 inserts the end of the nozzle 16c of the gun 16, mounted to the end of the robot arm 12a, to the vicinity of the bottom portion of a slot 56a of the rotor 56, after which, while the end of the nozzle 16c is moved towards an opening from the vicinity of the bottom portion of the slot 56a, the adhesive is discharged from the nozzle 16c, so that the adhesive is applied to the inner surface of the slot 56a. This makes it possible to cause the robot 12 to apply the adhesive to the inner surface of the slot 56a of the rotor 56 in the applying operation. When the nozzle 16c is inserted into the slot 56a, the adhesive is not discharged. The adhesive is discharged when the nozzle 16c is removed from the vicinity of the bottom portion of the slot 56a. Therefore, the amount of adhesive that is applied to a portion that is above the discharge opening 161 of the nozzle 16c is reduced, so that the amount of adhesive applied to each slot 56a is equalized.

In the embodiment, in particular, the placement table 38 for placing the gun 16 thereon and the gravimetric sensor 40 that detects the weights of detection objects including the gun 16 placed on the placement table 38 are provided. When the gravimetric sensor 40 detects the weights of the detection objects, it is possible to detect the remaining amount of adhesive in the cartridge 58 mounted to the holder 16a of the gun 16 serving as a detection object. When the gravimetric sensor 40 detects the weights of the detection objects before starting the applying operation and the weights of the detection objects after completion of the applying operation, it is possible to detect the amount of discharge of the adhesive discharged by the gun 16 (that is, the amount of adhesive applied to the inner surfaces of the slots 56a of the rotor 56).

In the embodiment, in particular, the alarm 42 is provided. When the difference between the weights of the detection objects detected by the gravimetric sensor 40 before starting the applying operation and the weights of the detection objects detected by the gravimetric sensor 40 after completion of the applying operation falls outside a desired range, the alarm 42 informs a user of this. This makes it possible for the user to reliably find out that the amount of adhesive discharged by the gun 16 in the applying operation is too small or too large.

In the embodiment, in particular, the robot controller 50 controls the robot 12 so that, after the applying operation performed as a result of coordination control of the high-order controller 52 ends and the gun 16 is removed from the end of the robot arm 12a, the ATC 70 is connected to the robot ATC 54 to mount the robot hand 46 to the end of the robot arm 12a, thereby allowing the two gripping members 46a of the robot hand 46 to grip a magnet 68 and to insert the magnet 68 into the slot 56a of the rotor 56 to whose inner surface the adhesive has been applied in the applying operation. This makes it possible to cause the robot to reliably perform the inserting operation in which, after the applying operation ends, the gun 16 is removed and the robot hand 46 is mounted, the two gripping members 46a of the robot hand 46 grip a magnet 68 and insert the magnet 68 into the slot 56a of the rotor 56 to whose inner surface the adhesive has been applied in the applying operation.

In particular, in the embodiment, the magnet re-gripping chuck 48 for adjusting a gripping position of the magnet 68 gripped by the two gripping members 46a of the robot hand 46 (mounted to the end of the robot arm 12a) to a substantially center position along a direction orthogonal to the direction of movement of the gripping members 46a is provided. In addition, the robot controller 50 controls the robot 12 so that, in the above-described inserting operation, the two gripping members 46a of the robot hand 46 mounted to the end of the robot arm 12a grip and move the magnet 68; ungrip the magnet 68 in the area 72, to set the magnet 68, and; then, when the magnet re-gripping chuck 48 has adjusted the gripping position of the magnet 68 to the substantially center position, the two gripping members 46a grip and move again the magnet 68 to insert the magnet 68 into the slot 56a of the rotor 56 to whose inner surface the adhesive has been applied in the applying operation. This makes it possible to cause the robot 12 to reliably perform the inserting operation in which the two gripping members 46a of the robot hand 46 grip and move the magnet 68; ungrip the magnet 68 in the area 72, to set the magnet 68; and, then, when the magnet re-gripping chuck 48 has adjusted the gripping position of the magnet 68 to the center position, the two gripping members 46a grip and move again the magnet 68 to insert the magnet 68 into the slot 56a of the rotor 56.

In the embodiment, in particular, the robot controller 50 controls the robot 12 so that, after the inserting operation ends, the robot hand 46 mounted to the end of the robot arm 12a performs a pushing operation for pushing down an opposite surface of the magnet 68 inserted into the slot 56a of the rotor 56. The opposite surface of the magnet 68 that is pushed is situated at a side opposite the front end side of the magnet 68 in the insertion direction. This makes it possible to cause the robot 12 to reliably perform the pushing operation in which, after the inserting operation ends, the opposite surface of the magnet 68 inserted into the slot 56a of the rotor 56 is pushed.

In the embodiment, in particular, the gun 16 includes the nozzle 16c that is mountable to the end of the cartridge 58. The nozzle 16c includes the discharge opening 161 that discharges an adhesive in the cartridge 58 mounted to the holder 16a. An end of the nozzle 16c is provided with the groove 162 that guides the adhesive discharged from the discharge opening 161, provided at the central portion in the radial direction, towards the outer periphery in the radial direction. Therefore, when the adhesive is discharged while the nozzle 16c is inserted in the inner portion of the slot 56a, the adhesive is guided along the groove 162 over the entire periphery of the nozzle 16c. As a result, the adhesive is uniformly applied to the inner surface of the slot 56a.

In the embodiment, in particular, the following advantages may be provided. That is, in general, as the amount of adhesive in the cartridge 58 decreases, the volume of a gap in the cartridge 58 increases. Therefore, the time of supply of compressed air into the cartridge 58 for discharging a certain amount of adhesive from the gun 16 is increased. Consequently, in the embodiment, using a previously set correction coefficient corresponding to the amount of adhesive in the cartridge 58, the high-order controller 52 corrects the on switching time of supply of compressed air into the cartridge 58 realized by the electromagnetic valve 22. Therefore, even when the amount of adhesive in the cartridge 58 is reduced, it is possible for the gun 16 to discharge a certain amount of adhesive.

The embodiment is not limited to the above-described content, so that various modifications can be made without departing from the gist and technical idea. For example, in the embodiment, separately from the robot controller 50 that controls the operation of the robot 12, the high-order controller 52 is provided. The high-order controller 52 synchronizes and controls the on/off switching control performed by the electromagnetic valve 22 of the supply of compressed air into the cartridge 58 and the control of the operation of the robot 12 performed by the robot controller 50. However, the embodiment is not limited thereto. That is, the robot controller may control the operation of the robot 12, and synchronize and control the on/off switching control performed by the electromagnetic valve 22 of the supply of compressed air into the cartridge 58 and the control of the operation of the robot 12. In this case, the robot controller corresponds to a robot controlling unit and an integrated controlling unit in the claims.

Although not exemplified, the above-described embodiment can be variously modified without departing from the gist of the embodiment.

It should be understood by those skilled in the art that various modifications, combinations, sub-combinations and alterations may occur depending on design requirements and other factors insofar as they are within the scope of the appended claims or the equivalents thereof.

What is claimed is:

1. An adhesive applying device that applies an adhesive to an object surface of an object, the adhesive applying device comprising:
    a robot including a robot arm;
    an object jig for setting thereat the object having the object surface;
    an adhesive filling unit including a holder to which a cartridge containing the adhesive is mountable, the adhesive filling unit discharging the adhesive in the cartridge mounted to the holder, the adhesive filling unit being mountable to an end of the robot arm of the robot;
    a first temperature maintaining unit that maintains in a desired range a temperature of the adhesive that is discharged from the adhesive filling unit;
    a second temperature maintaining unit that maintains in a desired range a temperature of the adhesive applied to the object surface of the object placed at the object jig;
    a supply controlling unit that performs on/off switching control of supply of fluid into the cartridge mounted to the holder of the adhesive filling unit, the fluid being supplied from a fluid supplying unit that supplies the fluid at a predetermined pressure;
    a robot controlling unit that controls an operation of the robot; and
    an integrated controlling unit that coordinates and controls the on/off switching control performed by the supply controlling unit and the control of the operation of the robot performed by the robot controlling unit,
    wherein the integrated controlling unit coordinates and controls the supply controlling unit and the robot controlling unit so that an applying operation in which the adhesive is applied to the object surface of the object that is set at the object jig is performed by discharging the adhesive from the adhesive filling unit mounted to the end of the robot arm while the robot operates the robot arm,
    wherein the adhesive applying device further comprises:
        a tool mountable to the end of the robot arm of the robot;
        a robot connecting member that is set at the end of the robot arm of the robot;
        a first connecting member that is set at the adhesive filling unit, the first connecting member being connectable to the robot connecting member; and
        a second connecting member that is set at the tool, the second connecting member being connectable to the robot connecting member,
    wherein the integrated controlling unit coordinates and controls the supply controlling unit and the robot controlling unit so that the applying operation is performed by discharging the adhesive from the adhesive filling unit while the robot operates the robot arm, the adhesive filling unit being mounted to the end of the robot arm by connecting the first connecting member to the robot connecting member, and
    wherein the robot controlling unit controls the robot so that, when the applying operation performed as a result of the coordination control performed by the integrated controlling unit ends, the adhesive filling unit is removed from the end of the robot arm by disconnecting the robot connecting member and the first connecting member from each other, and, then, the tool is mounted to the end of the robot arm by connecting the second connecting member to the robot connecting member, to perform a predetermined operation with respect to the object surface of the object to which the adhesive has been applied in the applying operation.

2. The adhesive applying device according to claim 1, further comprising:
    a placement table for placing the adhesive filling unit thereon; and
    a detecting unit that detects a weight of a detection object including the adhesive filling unit placed on the placement table.

3. The adhesive applying device according to claim 2, further comprising an informing unit, wherein, when a difference between the weight detected by the detecting unit before starting the applying operation and the weight detected by the detecting unit after completion of the applying operation falls outside a desired range, the informing unit informs that the difference falls outside the desired range.

4. The adhesive applying device according to claim 1,
    wherein the object jig allows the object to be set,
    wherein the object surface is provided at an inner side of a recessed portion,
    wherein the tool is a robot hand including two gripping members that are movable towards and away from each other, the robot hand being capable of gripping an adhesion object using the two gripping members, and
    wherein the robot controlling unit controls the robot so that, when the applying operation performed as a result of the coordination control of the integrated controlling unit ends, the adhesive filling unit is removed from the end of the robot arm, and, then, the second connecting member is connected to the robot connecting member to mount the robot hand to the end of the robot arm, so that, as the predetermined operation, an inserting operation is performed in which the two gripping members grip the adhesion object and insert the adhesion object into the recessed portion where the object surface of the object to which the adhesive has been applied in the applying operation is provided.

5. The adhesive applying device according to claim 4, further comprising an adjusting unit that adjusts a gripping position of the adhesion object gripped by the two gripping members of the robot hand mounted to the end of the robot arm of the robot to a center position along a direction orthogonal to a direction of movement of the gripping members,
wherein the robot controlling unit controls the robot so that, in the inserting operation, the two gripping members of the robot hand mounted to the end of the robot arm grip and move the adhesion object, ungrip the adhesion object in a predetermined area, to set the adhesion object, and, then, when the adjusting unit has adjusted the gripping position of the adhesion object to the center position, the two gripping members grip and move again the adhesion object to insert the adhesion object into the recessed portion where the object surface of the object to which the adhesive has been applied in the applying operation is provided.

6. The adhesive applying device according to claim 4, wherein the robot controlling unit controls the robot so that, after the inserting operation ends, the robot hand mounted to the end of the robot arm performs a pushing operation for pushing down an opposite surface of the adhesion object inserted in the recessed portion of the object, the opposite surface being situated at a side opposite a front end side of the adhesion object in an insertion direction.

7. The adhesive applying device according to claim 1,
wherein the object jig allows the object to be set,
wherein the object surface is provided in an inner side of a recessed portion, and
wherein the integrated controlling unit coordinates and controls the supply controlling unit and the robot controlling unit so that, in the applying operation, the robot inserts an end of the adhesive filling unit mounted to the end of the robot arm up to a vicinity of a bottom portion of the recessed portion of the object, after which, while the end of the adhesive filling unit is moved towards an opening from the vicinity of the bottom portion of the recessed portion, the adhesive is discharged from the adhesive filling unit, so that the adhesive is applied to the object surface provided in the inner side of the recessed portion.

8. The adhesive applying device according to claim 1, wherein the adhesive filling unit includes a nozzle including a discharge opening that discharges the adhesive in the cartridge mounted to the holder, the discharge opening being provided at a central portion of the nozzle in a radial direction, the nozzle being mountable to an end of the cartridge, the nozzle including at an end thereof a groove that guides the adhesive discharged from the discharge opening towards an outer periphery in the radial direction.

9. The adhesive applying device according to claim 1, wherein, using a correction coefficient that is previously set in correspondence with an amount of the adhesive in the cartridge mounted to the holder of the adhesive filling unit, the integrated controlling unit corrects an on switching time of the supply of the fluid from the fluid supplying unit realized by the supply controlling unit.

10. An adhesive applying device that applies an adhesive to an object surface of an object, the adhesive applying device comprising:
a robot including a robot arm;
an object jig for setting thereat the object having the object surface;
adhesive filling means including a holder to which a cartridge containing the adhesive is mountable, the adhesive filling means discharging the adhesive in the cartridge mounted to the holder, the adhesive filling means being mountable to an end of the robot arm of the robot;
first temperature maintaining means for maintaining in a desired range a temperature of the adhesive that is discharged from the adhesive filling means;
second temperature maintaining means for maintaining in a desired range a temperature of the adhesive applied to the object surface of the object placed at the object jig;
supply controlling means for performing on/off switching control of supply of fluid into the cartridge mounted to the holder of the adhesive filling means, the fluid being supplied from fluid supplying means that supplies the fluid at a predetermined pressure;
robot controlling means for controlling an operation of the robot; and
integrated controlling means for coordinating and controlling the on/off switching control performed by the supply controlling means and the control of the operation of the robot performed by the robot controlling means,
wherein the integrated controlling means coordinates and controls the supply controlling means and the robot controlling means so that an applying operation in which the adhesive is applied to the object surface of the object that is set at the object jig is performed by discharging the adhesive from the adhesive filling means mounted to the end of the robot arm while the robot operates the robot arm,
wherein the adhesive applying device further comprises:
a tool mountable to the end of the robot arm of the robot;
a robot connecting member that is set at the end of the robot arm of the robot;
a first connecting member that is set at the adhesive filling means, the first connecting member being connectable to the robot connecting member; and
a second connecting member that is set at the tool, the second connecting member being connectable to the robot connecting member,
wherein the integrated controlling means coordinates and controls the supply controlling means and the robot controlling means so that the applying operation is performed by discharging the adhesive from the adhesive filling means while the robot operates the robot arm, the adhesive filling means being mounted to the end of the robot arm by connecting the first connecting member to the robot connecting member, and
wherein the robot controlling means controls the robot so that, when the applying operation performed as a result of the coordination control performed by the integrated controlling means ends, the adhesive filling means is removed from the end of the robot arm by disconnecting the robot connecting member and the first connecting member from each other, and, then, the tool is mounted to the end of the robot arm by connecting the second connecting member to the robot connecting member, to perform a predetermined operation with respect to the object surface of the object to which the adhesive has been applied in the applying operation.

* * * * *